(12) United States Patent
Richards et al.

(10) Patent No.: US 10,341,622 B2
(45) Date of Patent: *Jul. 2, 2019

(54) MULTI-HALF-TONE IMAGING AND DUAL MODULATION PROJECTION/DUAL MODULATION LASER PROJECTION

(71) Applicant: Dolby Laboratories Licensing Corporation, San Francisco, CA (US)

(72) Inventors: Martin J. Richards, Redwood City, CA (US); Jerome Shields, Lumberton, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/266,374

(22) Filed: Apr. 30, 2014

(65) Prior Publication Data
US 2014/0333835 A1    Nov. 13, 2014

Related U.S. Application Data

(60) Provisional application No. 61/820,680, filed on May 7, 2013.

(51) Int. Cl.
*H04N 9/31*    (2006.01)

(52) U.S. Cl.
CPC ......... *H04N 9/3126* (2013.01); *H04N 9/3155* (2013.01); *H04N 9/3161* (2013.01); *H04N 9/3164* (2013.01)

(58) Field of Classification Search
CPC .. H04N 9/3126; H04N 9/3155; H04N 9/3161; H04N 9/3164
See application file for complete search history.

(56) References Cited

U.S. PATENT DOCUMENTS

| 5,751,264 A |   | 5/1998  | Cavallerano |
|-------------|---|---------|-------------|
| 5,978,142 A |   | 11/1999 | Blackham    |
| 5,986,640 A | * | 11/1999 | Baldwin ............. G09G 3/2033 345/596 |
| 6,215,469 B1 |  | 4/2001  | Mori        |

(Continued)

FOREIGN PATENT DOCUMENTS

| CN | 1645242 | 7/2005  |
|----|---------|---------|
| CN | 1879057 | 12/2006 |

(Continued)

OTHER PUBLICATIONS

Shin, H. et al "Rendering High Dynamic Range Images by Using Integrated Global and Local Processing" Nov. 2011, Optical Engineering, vol. 40, No. 11, published by SPIE.

(Continued)

*Primary Examiner* — Bao-Luan Q Le

(57) ABSTRACT

Smaller halftone tiles are implemented on a first modulator of a dual modulation projection system. This techniques uses multiple halftones per frame in the pre-modulator synchronized with a modified bit sequence in the primary modulator to effectively increase the number of levels provided by a given tile size in the halftone modulator. It addresses the issue of reduced contrast ratio at low light levels for small tile sizes and allows the use of smaller PSFs which reduce halo artifacts in the projected image and may be utilized in 3D projecting and viewing.

18 Claims, 3 Drawing Sheets

(56) References Cited

U.S. PATENT DOCUMENTS

| | | | |
|---|---|---|---|
| 6,466,225 B1 | 10/2002 | Larkin | |
| 6,529,204 B1 | 3/2003 | Mikoshiba | |
| 6,629,746 B2 | 10/2003 | Waldner | |
| 6,927,890 B2 | 8/2005 | Allen | |
| 7,002,533 B2 | 2/2006 | Sayag | |
| 7,050,122 B2* | 5/2006 | Gibbon | H04N 5/20 348/678 |
| 7,064,740 B2 | 6/2006 | Daly | |
| 7,245,327 B2 | 7/2007 | Willis | |
| 7,403,332 B2 | 7/2008 | Whitehead | |
| 7,551,341 B1* | 6/2009 | Ward | G03B 33/08 359/248 |
| 7,575,327 B2* | 8/2009 | Uchiyama | G03B 21/00 349/7 |
| 7,609,235 B2 | 10/2009 | Thebault | |
| 7,683,919 B2* | 3/2010 | Asahi | G09G 3/346 345/204 |
| 7,753,530 B2 | 7/2010 | Whitehead | |
| 8,125,702 B2* | 2/2012 | Ward | G03B 33/08 359/248 |
| 8,297,759 B2 | 10/2012 | Quinn | |
| 8,493,313 B2 | 7/2013 | Damberg | |
| 8,542,408 B2* | 9/2013 | Lieb | G09G 3/007 345/589 |
| 8,593,579 B2* | 11/2013 | Ishino | G03B 21/00 348/751 |
| 9,154,752 B2* | 10/2015 | Kobayashi | H04N 9/3126 |
| 9,202,418 B2* | 12/2015 | Goerzen | G09G 3/3413 |
| 2004/0001184 A1* | 1/2004 | Gibbons | H04N 5/20 353/31 |
| 2005/0151934 A1 | 7/2005 | Akutsu | |
| 2005/0190140 A1* | 9/2005 | Asahi | G09G 3/346 345/100 |
| 2005/0195223 A1 | 9/2005 | Nitta | |
| 2008/0007514 A1 | 1/2008 | Tanaka | |
| 2008/0018466 A1 | 1/2008 | Batra | |
| 2008/0158245 A1* | 7/2008 | Lieb | G09G 3/007 345/596 |
| 2008/0158672 A1* | 7/2008 | McCosky | H04N 13/0431 359/464 |
| 2008/0180466 A1 | 7/2008 | Whitehead | |
| 2008/0192155 A1* | 8/2008 | Uchiyama | G03B 21/00 349/8 |
| 2009/0161029 A1* | 6/2009 | Sakaguchi | H04N 9/3126 348/751 |
| 2009/0225234 A1* | 9/2009 | Ward | G03B 33/08 348/744 |
| 2009/0262261 A1* | 10/2009 | Ishino | G03B 21/00 348/744 |
| 2010/0315441 A1 | 12/2010 | Kang | |
| 2011/0205494 A1* | 8/2011 | Richards | G02B 5/20 353/7 |
| 2011/0292289 A1* | 12/2011 | Kobayashi | H04N 9/3126 348/607 |
| 2012/0038693 A1 | 2/2012 | Kang | |
| 2012/0081387 A1 | 4/2012 | Messmer | |
| 2012/0092360 A1 | 4/2012 | Kang | |
| 2012/0120096 A1 | 5/2012 | Johnson | |
| 2013/0106923 A1 | 5/2013 | Shields | |
| 2014/0204134 A1* | 7/2014 | Goerzen | H04N 9/3126 345/697 |

FOREIGN PATENT DOCUMENTS

| | | |
|---|---|---|
| JP | 2005-196215 | 7/2005 |
| KR | 10-2008-0010820 | 1/2008 |
| RU | 2440623 | 1/2012 |
| WO | 2009/073187 | 6/2009 |
| WO | 2012/125756 | 9/2012 |

OTHER PUBLICATIONS

Szymon, G et al. "Size of the Halo of the Adaptive Optics PSF" Proc. of SPIE—The International Society for Optical Engineering, v. 8447, Jul. 2012.

* cited by examiner

MULTI-HALF-TONE IMAGING AND DUAL MODULATION PROJECTION/DUAL MODULATION LASER PROJECTION

CROSS REFERENCE TO RELATED APPLICATIONS

This application claims benefit of priority to related, U.S. Provisional Patent Application No. 61/820,680 filed on May 7, 2013 entitled "Multi-Half-Tone Imaging and Dual Modulation Projection/Dual Modulation Laser Projection"; wherein the disclosure of reference is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to display devices and more particularly to dual modulation projectors (including laser projectors) and the creation of half-tone images in a pre-modulator of the projector.

Discussion of Background

Dual modulation projectors and displays include display devices (e.g., Whitehead U.S. Pat. No. 7,403,332, and Daly U.S. Pat. No. 7,064,740) and projectors (e.g., Sayag U.S. Pat. No. 7,002,533).

SUMMARY OF THE INVENTION

The present inventors have realized the need for improved half-toning of pre-modulator images. The invention allows the use of smaller halftone tiles on the first modulator of a dual modulation projection system. This techniques uses multiple halftones per frame in the pre-modulator synchronized with a modified bit sequence in the primary modulator to effectively increase the number of levels provided by a given tile size in the halftone modulator. It addresses the issue of reduced contrast ratio at low light levels for small tile sizes and allows the use of smaller PSFs which reduce halo artifacts in the projected image. The half toning may also be utilized to improve projection of color or polarization separated 3D imagery.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The current dual modulation POC EDR projector uses a single half tone image per frame on the pre-modulator. To limit halo size on small bright features and to achieve high local contrast, a small PSF is desirable. The first nonzero premod level is achieved by superimposing a field of PSFs to achieve a relative flat light field. For a given (small) PSF size, the spacing of the half-tone non-zero pixels must be smaller than the PSF, and small enough to achieve this flat field. This limits the percentage of pixels that must be non-zero to a certain level, and this determines the first nonzero average level, and the number of discrete linear pre-modulation levels. For example, a PSF that must be repeated on a 5×5 grid will require 1 of 25 pre-modulator pixels to be turned on, resulting in a minimum $\frac{1}{25}$ non-zero level, and 25 discrete premod levels.

Figure 3:
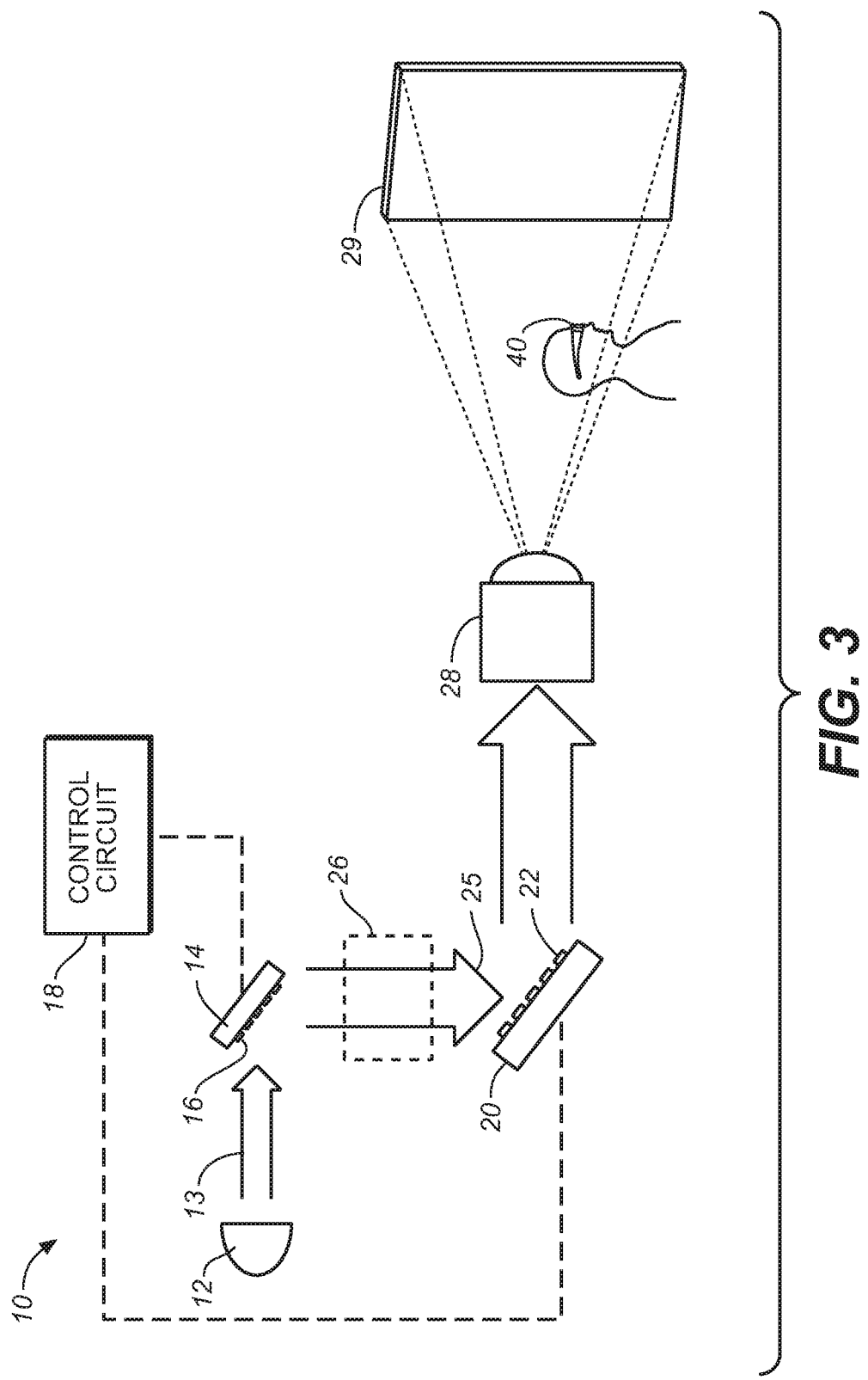
FIG. 3 is a schematic diagram of a dual modulation display.

FIG. 3 shows schematic diagram of a dual modulation display. Display 10 comprises a light source 12. Light source 12 may comprise may comprise, for example: a laser; a xenon lamp; an array of laser diodes or other solid-state light emitters; an arc lamp; or the like. Alternatively, light source 12 may comprise at least 2 sets of light wavelengths each set comprising red, green, and blue wavelength lights wherein at least one of the same color wavelengths in different sets are separated by a minimum bandwidth necessary to accomplish off-axis viewing without cross-talk through passbands of viewing glasses at normal and off-axis viewing encountered in a standard cinema theater or cinema presentation at a theme park or as part of a theme park ride. The off-axis viewing may be one of approximately 20 degrees and not more than 20 degrees, and a max angle normally encountered in the presentations.

Light 13 from light source 12 illuminates a first spatial light modulator 14. First spatial light modulator ("Pre-Modulator") 14 comprises a plurality of controllable elements 16. First spatial light modulator 14 may comprise a MEMS or a DMD in some embodiments. Second spatial light modulator ("Primary Modulator") 20 may comprises a plurality of controllable elements 22, accepting light 25 from the pre-modulator (through optional elements 26). Controller 18 sends control signals (e.g., energization signals) to both premodulator and primary modulator, wherein the dual modulation energization signals may comprise a pre-modulator energization signal comprising more than one half-tone image each to be displayed or energized on a pre-modulator of a dual modulation display system during a single frame time period in synchronization with a primary modulator signal comprising an image to be displayed or energized on a primary modulator of the dual modulation display system. Further, the half-tone images may be generated via tiles on the pre-modulator, wherein each tile comprises an array of modulating elements e.g., wherein each tile may comprise a n×n array of mirrors.

Light from the primary modulator may be transmitted through a projector lens 28 and projected on screen 29. The image on screen 29 may be viewed by a viewer wearing active glasses 40 (e.g., configured for 3D viewing). User may be sitting in a theater and viewing the image on screen 29 at some off-axis angle.

The image from the system described can have about 25× the contrast ratio (CR) of the primary modulator; if the original CR of the primary modulator was 1800, then the final image could have CRs of 45,000:1. This assumes that 1 of 25 pixels are always on. Since the premod DMD is capable of >1800:1 CR, with the premod pixels off, the black level could be much better than 1/45000 of peak white; however turning off all of the premod pixels can have deleterious effects. These effects are also present in the images at low light levels, even with some pixels on. For example, some image features vary with spatial frequencies beyond those that can be represented by the premod light field. For these image features, the premod light field will be constant, un-modulated. The level of the premod light field will be determined by local max of the image feature. The primary DMD must reduce the premod light field to produce all levels of the local image feature. Depending on the first nonzero premod level, the primary DMD might not have sufficient contrast to produce the lowest levels, limiting the local contrast of that image feature enough to affect its appearance. This is especially critical around the area where the last pixels on the premod tiles are turned off. In this area the local contrast goes down to around 20. These issues could be resolved by increasing the size of the PSF and tile, but this would increase the halo size, which also can produce visible artifacts.

Figure 1:
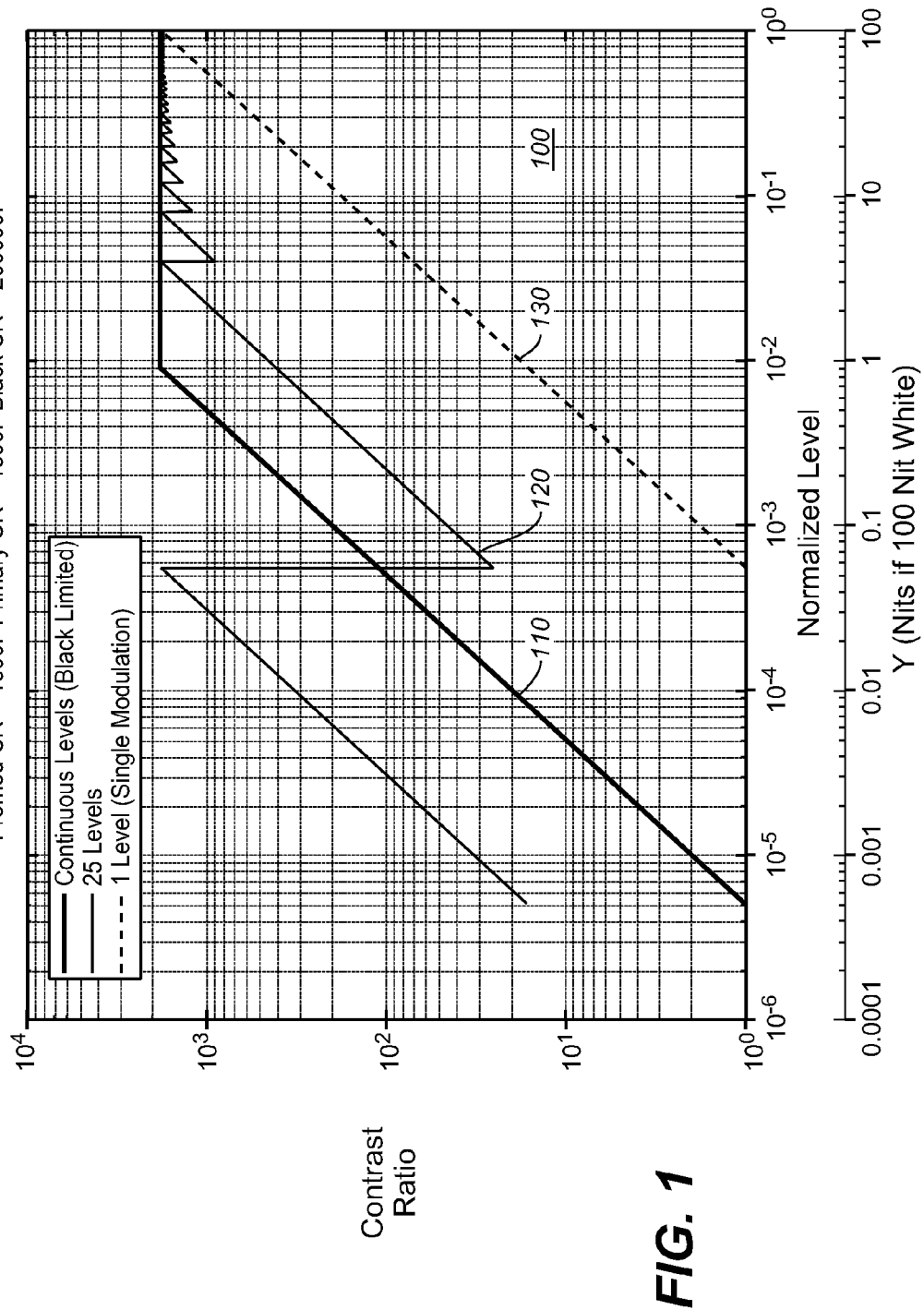
FIG. 1 is an illustration of the effects of the number of discrete pre-modulation levels on local contrast.

FIG. 1 helps illustrate the issues. The blue line (starting on the horizontal axis between 10E-6 and 10E-5) represents the best Contrast Ratio that could be achieved in this particular auditorium with an ideal infinite contrast ratio 100 nit capable projector. This limit is caused because the room has a dark level of 0.0005 nits as measured at the screen. This is from ambient room light in the room that reaches and is reflected from the screen to the viewer. The red line (starting on the horizontal axis between 10E-4 and 10E-3) represents a single modulation projector. The projector has an 1800:1 contrast ratio (simultaneous and sequential). As the peak level of the local image gets darker with this projector, the contrast ratio in the local image decreases proportionally because the dark level is constant. This is normal and expected behavior.

The light green line (the thinner line) represents the contrast ratio possible with a dual modulation projector with high spatial frequency components (where the premod is locally constant). As the projected image gets locally darker just out of peak white, the contrast ratio curve matches exactly the previous case. However, when the level reaches (in this example) about 24/25 of peak white, the premod can change its value from 25/25 to 24/25 pixels on, and the primary modulator can again use its full range. Thus, for this lower light level we again have full 1800:1 local contrast ratio. For the situation just before the premod changed its value (to 23/25), the local contrast ratio would be reduced to 24/25*1800. This situation proceeds through each change in the premod, with the possible CR resetting back up to 1800 after each change. For example when 2 pixels are active, the CR goes down to 144 (2/25*1800). When only a single pixel is active, the premod cannot change until the leakage light through the pre-modular is high enough to achieve the desired output level with the primary modulator alone (full on). In the illustrative example, this level is 1/1800 of the output peak. There is a large gap between the lowest modulation level achieved by the half-ton at 1/25, and 1/1800, and in this zone the premod must be kept at the 1/25 level. The primary modulator is the sole modulator for this region, and the contrast ratio falls to a level of about 1/25 before the premod halftone can be set to zero. This level is significantly lower (below the blue line by about a factor of 4) than what could be obtained in this room with an ideal projector.

One purpose of this invention is to reduce the effects of these artifacts by increasing the number of levels in the pre-modulator, but without increasing the tile size or PSF size. The concept is relatively simple; use more than a single halftone image per frame. In the earlier description a 5×5 tile was examined. The following describes using a 5×5 tile, but using 4 subframe halftones per frame. In this example, on an individual pixel basis for each tile, the pixel can take on a sequence of 5 values, these being 0, 1, 2, 3, or 4 subframes (0, ¼ frame, ½ frame, ¾ frame, or 1 frame). This allows the 5×5 tile to express 100 positive values (and 0) rather than the original 25 values (and 0). If a DMD (TI Digital Mirror Device) is used for the primary modulator, modification of the bit sequences for the modulation chips will be required. The DMD uses a form of pulse width modulation to modulate the light; therefore, the light is required to be constant during the entire frame period. Changing the pre-mod halftones during the frame (4 times) would produce a non-constant light, and interfere with the PWM result.

Normally the DMD is used with a single sequence per frame to obtain a 16 bit per pixel modulation. It is proposed to modify the bit sequence so that the higher order bits are spread across the frame period; therefore, they are repeated multiple times. For example, if the top 14 bits (of 16) are repeated, this would allow a pattern with the top 14 bits repeated 4 times. The lower significant bits would remain unaffected, (spread across the entire frame period). This type of repeated sequencing has been described in the literature and is used to reduce motion artifacts with DMD based projection systems. U.S. Pat. No. 5,986,640 describes a similar technique. The halftone image on the pre-modulator would be synchronized with the repeated sequences in the primary modulator such that both modulators would change to a new sequence at the same time.

Figure 2:
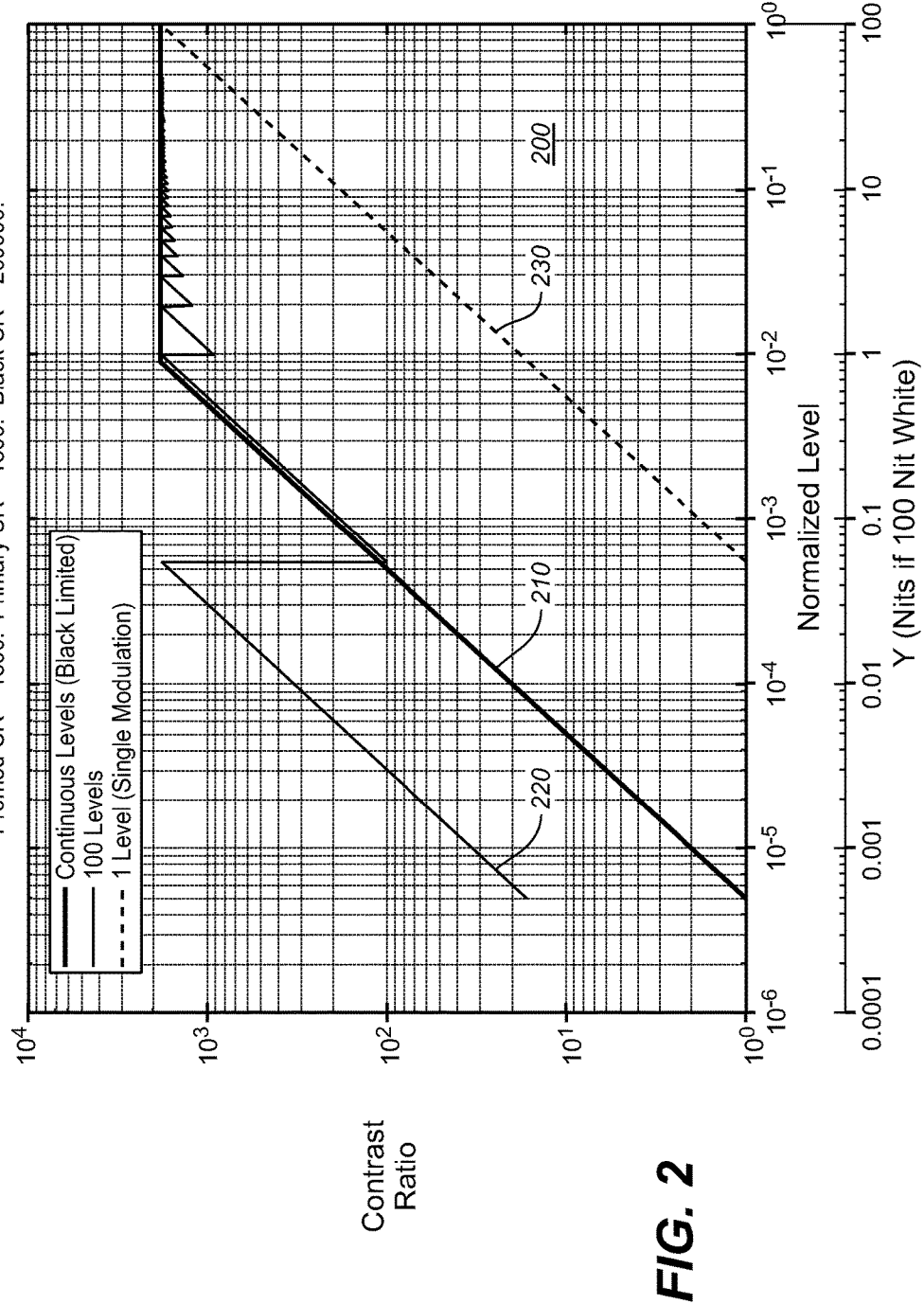
FIG. 2 is an illustration of improved results obtained when the halftone image is distributed across 4 subframes.

FIG. 2 illustrates the improved results obtained when the halftone image is distributed across 4 subframes as described above.

For this situation, the lowest contrast ratio from the projector is approximately equal to the results that could be obtained with an ideal projector in this room. This technique reduces the undesirable contrast ratio reduction without increasing tile size and corresponding PSF size.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to modulators, frames, subframes, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW+/-, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, prepareing half-tone images corresponding to image data, dividing frames, synchronizing and applying bit sequences to DMDs, and the display, storage, or communication of results according to the processes of the present invention.

The present invention may suitably comprise, consist of, or consist essentially of, any of element (the various parts or features of the invention and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for reducing halo artifacts in a final image rendered upon a dual modulation display system by creating a Point Spread Function (PSF) of a desired size with a first, pre-modulator that illuminates a second, primary modulator comprising the step of preparing a dual modulation energization signal comprising a pre-modulator energization signal comprising a plurality of half-tone images, each of the plurality of half-tone images to be displayed or energized on a pre-modulator of a dual modulation display system over a plurality of sub-frames time periods during a single frame time period, wherein further the single frame period is a modulation period of the primary modulator and the sub-frame time period is a modulation period of the pre-modulator and the pixel elements of the primary modulator are switched on/off once during the single frame period and the pixel elements of the pre-modulator are switched on/off once during a single sub-frame period and further that the single frame period comprises a plurality of sub-frame time periods, thereby increasing the number of levels in the pre-modulator without increasing PSF size, in synchronization with a primary modulator signal comprising an image to be displayed or energized on a primary modulator of the dual modulation display system, the primary modulator signal further comprising a bit sequence of N bits per pixel wherein the higher order bits are spread out across the frame synchronized with the pre-modulator energization signal.

2. The method according to claim 1, wherein the half tone images are each displayed in a plurality of sub-frame time period each synchronized with the primary modulator signal.

3. The method according to claim 1, wherein the pre-modulator signal is divided into a plurality of sub-frame images each sub-frame image energized in its own sub-frame time interval each sub-frame time interval synchronized with an interval of energization of the primary modulator and the primary modulator signal.

4. The method according to claim 1 wherein the method is implemented in a cinema projector having laser light sources illuminating the premodulator.

5. The method according to claim 4, wherein the laser light sources are locally and globally modulated.

6. The method according to claim 4, wherein the laser light sources are configured to emit at least 2 sets of light wavelengths each set comprising red, green, and blue wavelength lights wherein at least one of the same color wavelengths in different sets are separated by a minimum bandwidth necessary to accomplish off-axis viewing without cross-talk through passbands of viewing glasses at normal and off-axis viewing.

7. The method according to claim 6, wherein the off-axis viewing is one of approximately 20 degrees and not more than 20 degrees.

8. The method according to claim 1, wherein the half-tone image is generated via tiles on the pre-modulator, wherein each tile comprises an array of modulating elements.

9. The method according to claim 8, wherein each tile comprises a n×n array of mirrors.

10. The method according to claim 9, wherein the pre-modulator comprises a Digital Mirror Device (DMD) and each tile comprises a subset of mirrors of the DMD device.

11. The method according to claim 8, wherein the pre-modulator and the primary modulator are DMD devices.

12. The method according to claim 1, wherein a dark level of images produced approaches an ambient dark level in a room where the images are produced.

13. The method according to claim 12, wherein the pre-modulator is held at a constant level for some images and modulated for others and wherein the dark level of images produced with the modulated pre-modulator images approach the ambient dark level of the room in which the image as are produced.

14. The method according to claim 13, further comprising the step of determining a spatial frequency of images to be produced and maintaining a constant pre-modulator for image having a spatial frequency beyond a pre-determined threshold and modulating the pre-modulator for images at or below the spatial frequency threshold.

15. The method according to claim 13, wherein the pre-modulator is held constant when light levels in an image to be produced are below a predetermined light level threshold.

16. The method according to claim 13, wherein when the pre-modulator is held constant the primary modulator is energized using a different schema.

17. The method according to claim 13, wherein the pre-modulator comprises a DMD and each mirror of the DMD is set to on when the pre-modulator is held constant.

18. The method according to claim 13, wherein the method is performed in a laser based projector and the ambient dark level comprises a dark level at a screen configured to display the produced images in a venue.

* * * * *